United States Patent [19]
Itagaki et al.

[11] Patent Number: 6,067,091
[45] Date of Patent: *May 23, 2000

[54] GRAPHIC DISPLAY CONTROL APPARATUS FOR SELECTIVELY DISPLAYING COMPONENT FIGURES BASED ON HEIGHT LEVEL

[75] Inventors: Hajime Itagaki, Sapporo; Minoru Koshiba, Kawasaki, both of Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/728,854

[22] Filed: Oct. 10, 1996

[30] Foreign Application Priority Data

Oct. 25, 1995 [JP] Japan .................................. 7-277537

[51] Int. Cl.⁷ .................................................. G06T 15/00
[52] U.S. Cl. .......................................................... 345/435
[58] Field of Search ..................................... 395/133, 135, 395/119–122, 134, 340–345; 345/419–422, 433–435, 340–345

[56] References Cited

U.S. PATENT DOCUMENTS 4,907,174   3/1990   Priem ........................................ 395/22
5,329,613   7/1994   Brase et al. .............................. 345/422

OTHER PUBLICATIONS

Zirbel et al "Using AutoCAD Release 13 for Windows" pp 175–191, 1995.

Primary Examiner—Almis R. Jankus
Attorney, Agent, or Firm—Staas & Halsey LLP

[57] ABSTRACT

A graphic display control apparatus displays a plurality of two-dimensional component figures respectively corresponding to a plurality of components by overlapping these component figures with each other, in a CAD system concerning the plurality of components. The graphic display control apparatus includes a component figure storage unit for storing, in advance, information about height levels of components in one-to-one correspondence to the plurality of component figures. A displayed level range input unit inputs a range of height levels of components that are the object of component figure display. A displayed figure retrieving unit retrieves and fetches the component figures, which are situated within the range of height levels input from the displayed level range input unit, from the component figure storage unit. The component figures output from the displayed figure retrieving unit are selectively displayed on a graphic display unit such as a CRT.

11 Claims, 10 Drawing Sheets

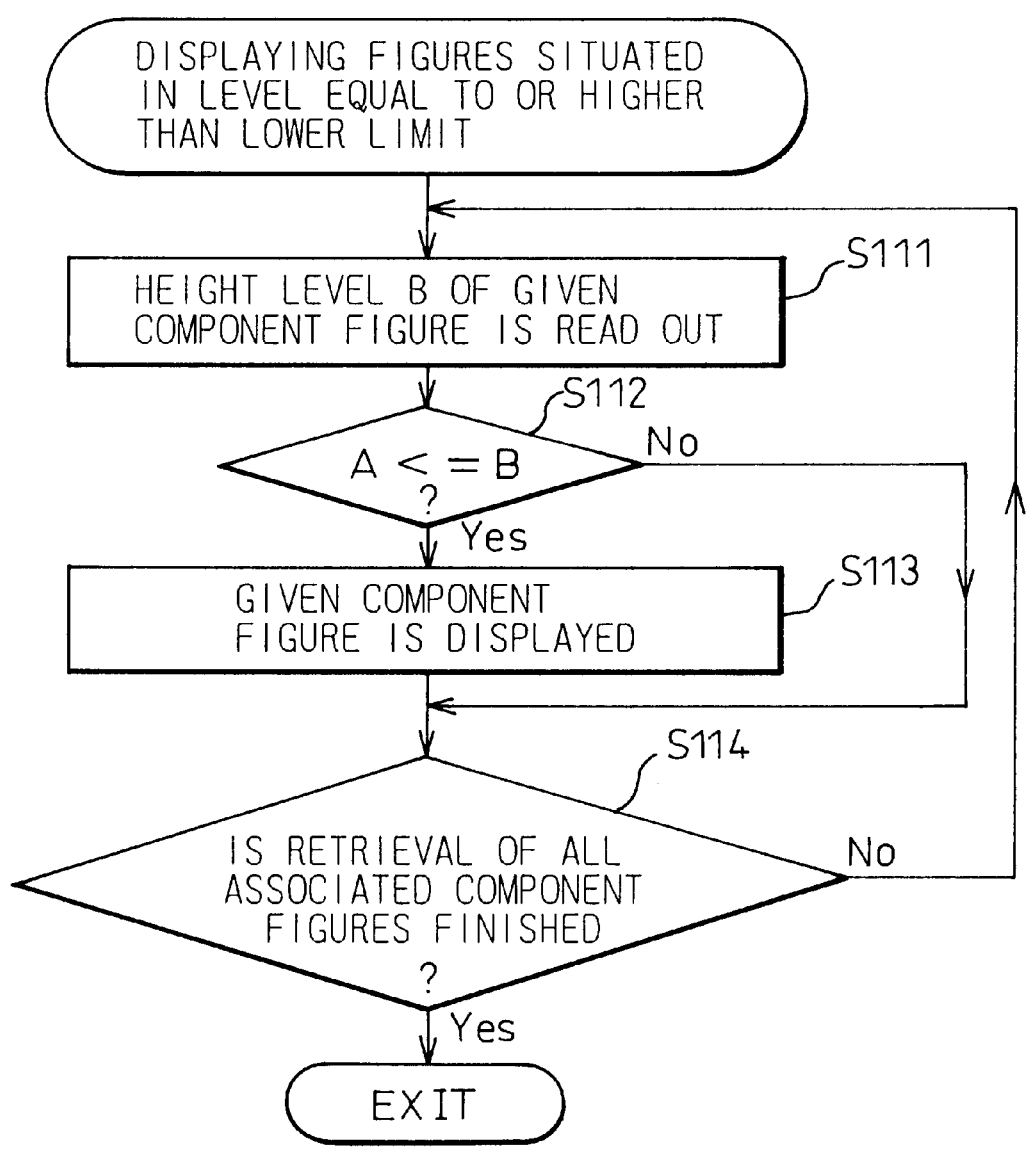

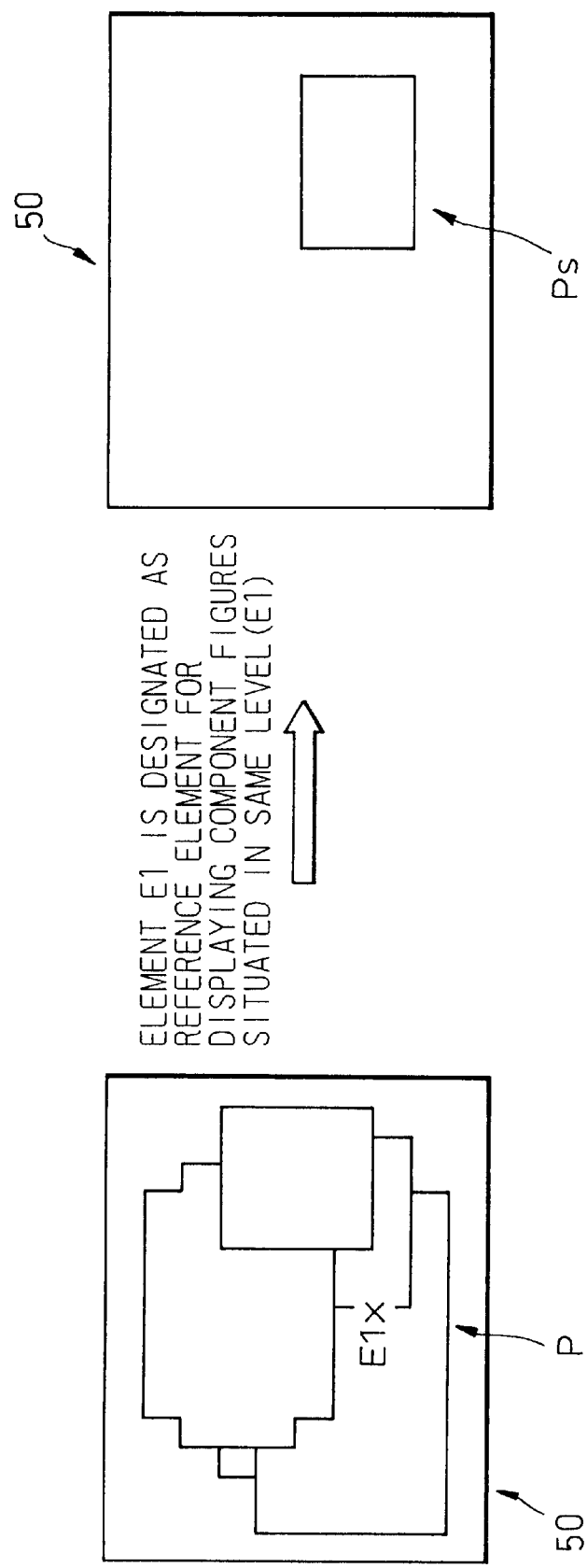

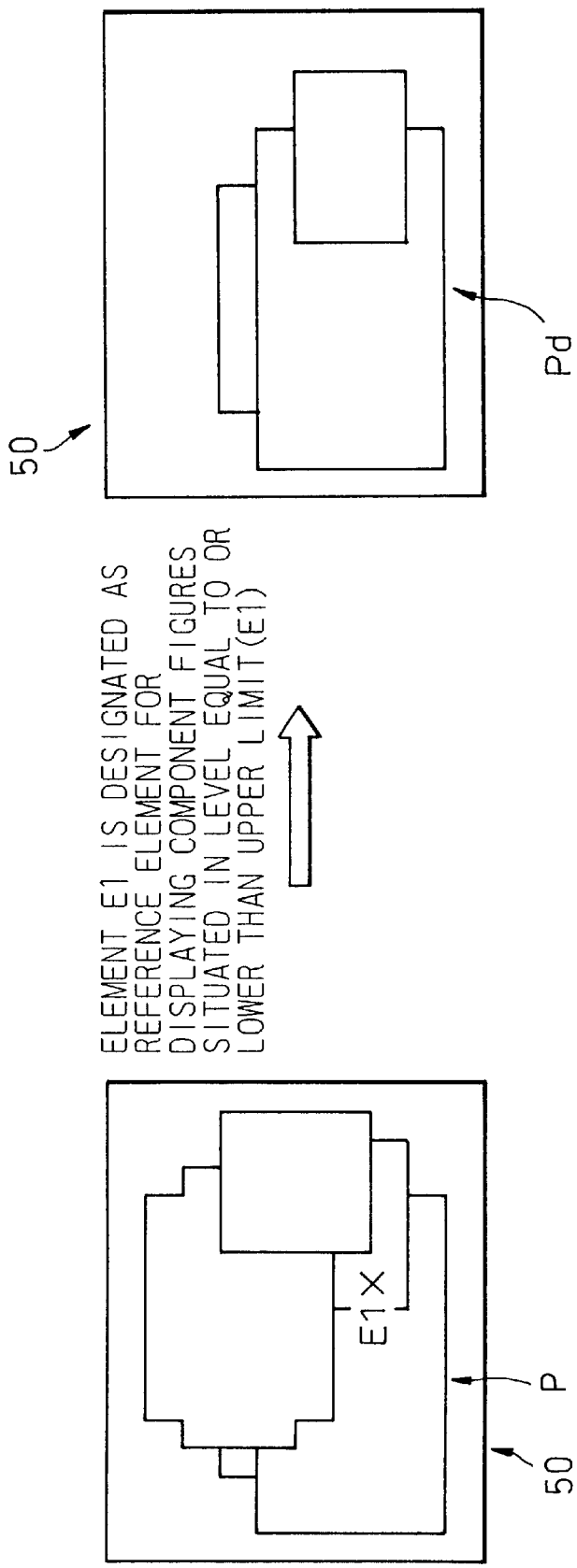

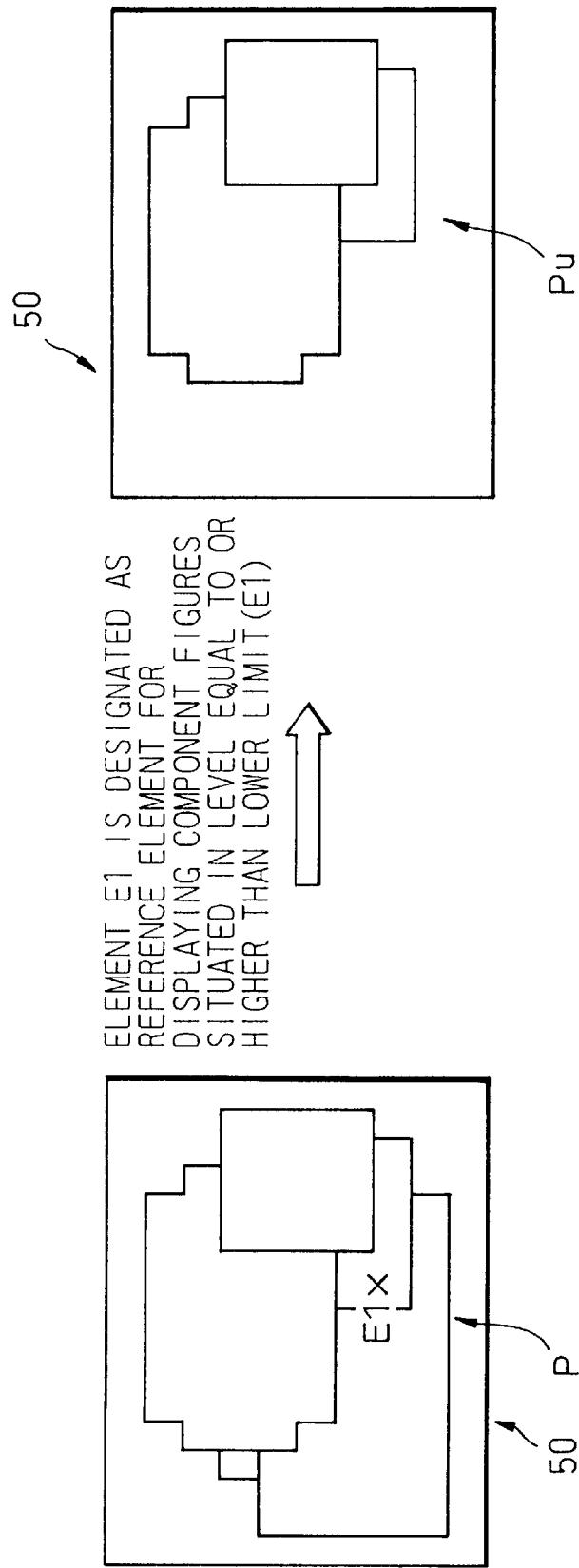

GRAPHIC DISPLAY CONTROL APPARATUS FOR SELECTIVELY DISPLAYING COMPONENT FIGURES BASED ON HEIGHT LEVEL

BACKGROUND OF THE INVENTION

1. Field of the Invention

The present invention relates to a graphic display control apparatus for displaying a plurality of component figures respectively corresponding to a plurality of components in a two-dimensional form, by overlapping these component figures with each other in a computer aided design (hereinafter abbreviated to CAD) system.

To be more specific, the present invention relates to a graphic display control apparatus having an ability to overlap a plurality of component figures with each other and display the same on a screen so as to edit figures by utilizing a two-dimensional CAD system, or more particularly, to modify the shape of each of the component figures consisting of gears and the like which are situated overlaid with other, or to change the relationship concerning the location of each of the component figures.

2. Description of the Related Art

In general, for editing component figures using a two-dimensional CAD system, when a function of automatic hidden-line elimination is unavailable, if lines defining frames of a plurality of component figures are overlapped with each other and displayed on a screen of a cathode-ray tube (CRT) or the like, all the lines defining the frames of the component figures residing at the lower level locations are all seen transparently. This causes a drawback that it becomes difficult to grasp the relationships concerning the height direction (i.e., vertical direction) among a plurality of components.

To cope with this drawback, in a conventional graphic display control apparatus, the function of automatic hidden-line elimination is implemented in a two-dimensional CAD system. Respective component figures are painted uniformly so that each of the lines defining the component figures residing at the lower level locations cannot be seen transparently.

When this kind of function of automatic hidden-line elimination is used to edit component figures, it becomes easier to grasp the relationship concerning the height direction among a plurality of components on a screen of a CRT or the like. Consequently, modifying the shape of each of plural component figures or changing the relationship concerning the location among component figures can presumably be achieved efficiently.

However, in a graphic display control apparatus utilizing the foregoing CAD system including the function of automatic hidden-line elimination, when an attempt is made to modify the shape of each of some components or the relationship concerning the location among some components in an assembly drawing produced by combining numerous components, there arises a problem that it is difficult to manipulate components that should be modified, on a screen, because of a hindrance caused by components other than the components that should be modified.

In particular, when component figures of components residing at the higher level locations are larger than component figures of components residing at the lower level locations, since the components at the lower level locations cannot be seen transparently, these components are hidden behind the components at the higher level locations and are therefore not displayed. If a designer or the like attempts to edit the component figures at the lower level locations, these component figures cannot be seen on a screen.

SUMMARY OF THE INVENTION

The present invention attempts to solve the foregoing problems. An object of the present invention is to provide a graphic display control apparatus in which when a CAD system including a function of automatic hidden-line elimination is used to produce an assembly drawing by combining numerous components with each other, if an attempt is made to modify the shape of each of specific components or the relationship concerning the location among the specific components, the component figures of the components that should be modified can be manipulated easily on a screen without the hindrance caused by components other than the components that should be modified.

To attain the foregoing object, a graphic display control apparatus according to the present invention comprises:

- a component figure storage means that when a plurality of two-dimensional component figures respectively corresponding to a plurality of components are overlapped with each other and displayed, in a computer aided design (CAD) system concerning the plurality of components, stores information of height levels of the components in one-to-one correspondence to the plurality of component figures;
- a displayed level range input means for inputting a range of height levels of components that are the object of component figure display; and
- a displayed figure retrieving means for retrieving and fetching component figures, which are situated within the range of height levels input using the displayed level range input means, from the component figure storage means.

In this case, the component figures output from the displayed figure retrieving means are selectively displayed.

Preferably, the graphic display control apparatus of the present invention includes a graphic display means for displaying the component figures output from the displayed figure retrieving means.

More preferably, in the graphic display control apparatus of the present invention, the range of height levels designated using the displayed level range input means indicates only one height level.

More preferably, in the graphic display control apparatus of the present invention, the range of height levels designated using the displayed level range input means indicates an area including one height level and levels lower than this height level.

More preferably, in the graphic display control apparatus of the present invention, the range of height levels designated using the displayed level range input means indicates an area including one height level and levels higher than this height level.

When component figures are edited according to the present invention, the shape of each of plural specific components or the relationship concerning the location among the specific components is modified. In consideration of the fact that if only some components situated within a given range of height levels could be displayed, the modification of the shape of each of specific components, etc., would be achieved satisfactorily, information about a height level is appended to each two-dimensional component figure. Furthermore, only the component figures situated within a range of height levels, which are designated by a designer or the like by using the displayed level range input means, are displayed on a screen, so that the component figures can be easily manipulated on the screen. In this case, the range of height levels is basically designated with an upper limit and lower limit of these height levels.

Furthermore, component figures situated within the range of height levels designated using the displayed level range input means are fetched from the component figure storage means and input to a graphic display means such as a graphic display unit.

The graphic display means selectively displays in a screen the component figures situated within the range of height levels designated using the displayed level range input means.

Herein, it is possible to designate an upper limit and lower limit each having the same value, that is, one height level as the range of height levels. In this case, only the component figures situated at a height level designated by a designer are displayed in the screen.

Furthermore, in designating the range of height levels, the lower limit may be set to a minimum value (for example, zero). In this case, component figures situated in an area including a height level (upper limit) designated by a designer and all the height levels lower than the upper limit are displayed on a screen.

Furthermore, in designating the range of height levels, the upper limit may be set to a maximum value (for example, infinity). In this case, component figures situated in an area including a height level (lower limit) designated by a designer and all the height levels higher than the lower limit are displayed on a screen.

Whichever method of designation is used to designate a display range of component figures, since information about a height level is appended to each component figure, a designer can selectively display necessary component figures using the thus appended height levels. Therefore, it is possible to prevent any components other than those whose shapes or positional relationship should be modified from becoming hindrances.

Thus, according to the present invention, when an assembly drawing is produced by combining numerous components with each other in a CAD system having a function of automatic hidden-line elimination, a designer can display or edit component figures with relatively simple operations without a necessity for intervening in a work flow. Production of an assembly drawing or the like can be carried out readily.

BRIEF DESCRIPTION OF THE DRAWINGS

The above object and features of the present invention will be more apparent from the following description of the preferred embodiments with reference to the accompanying drawings, wherein:

FIG. 7 is a flowchart for describing a procedure for displaying component figures on the basis of a function of displaying figures situated in a level equal to or higher than a lower limit which is shown in FIG. 3;

FIG. 8 shows a state in which component figures that are the object of the same level display are fetched and displayed on a graphic display unit;

FIG. 9 shows a state in which component figures that are the object of the lower level display are fetched and displayed on the graphic display unit; and FIG. 10 shows a state in which component figures that are the object of the higher level display are fetched and displayed on the graphic display unit.

DESCRIPTION OF THE PREFERRED EMBODIMENTS

Referring to the appended drawings (FIGS. 1 to 9), a basic embodiment and preferred embodiment of the present invention will be described below.

Figure 1:
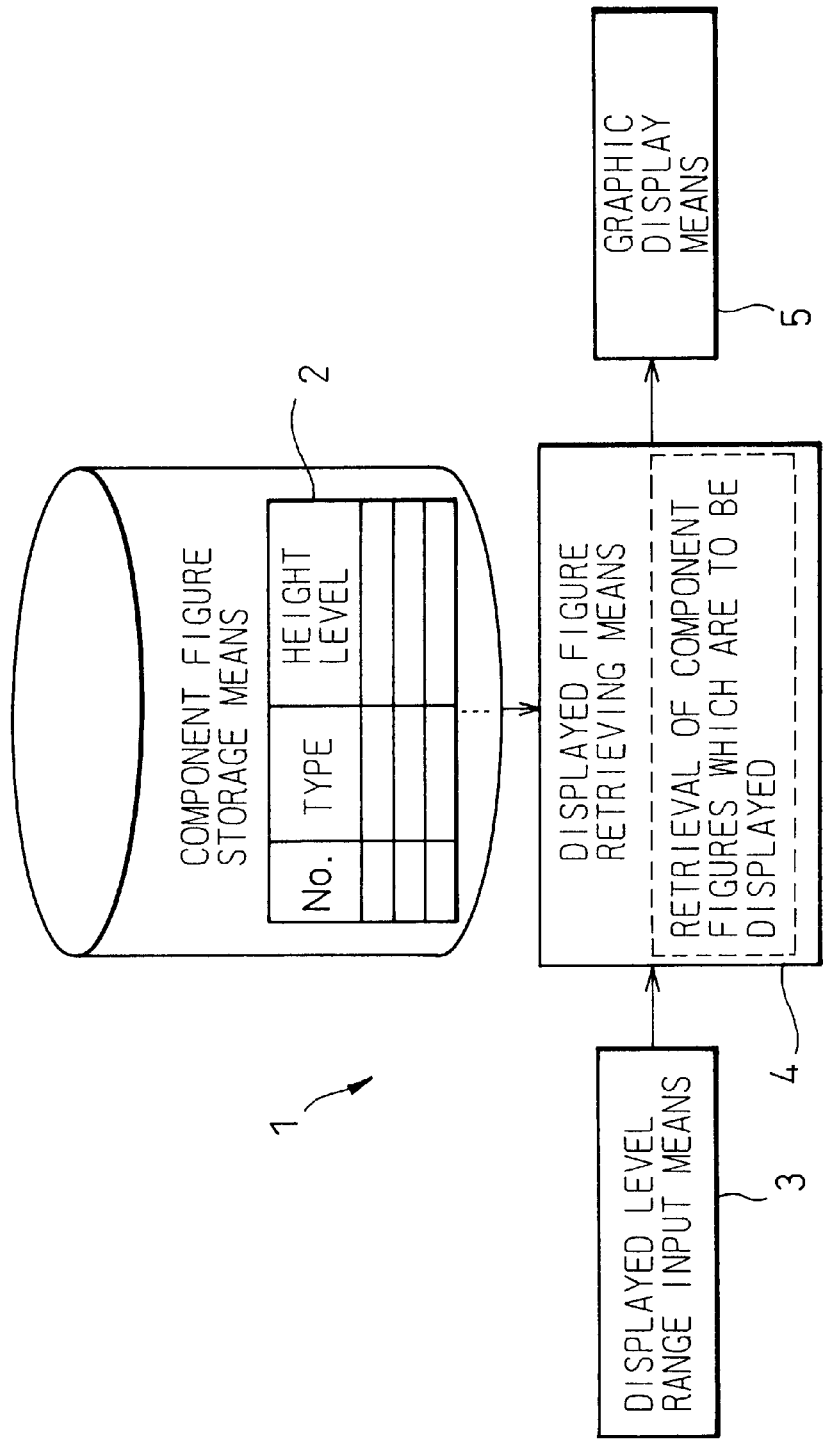
FIG. 1 is a block diagram showing the configuration of a basic embodiment based on the principle of the present invention.

FIG. 1 is a block diagram showing the configuration of a basic embodiment based on the principle of the present invention. The basic embodiment shown in FIG. 1 is concerned with a graphic display control apparatus for displaying a plurality of two-dimensional component figures respectively corresponding to a plurality of components with the component figures overlapped with each other in designing the plurality of components by using a CAD system. It should be noted that, herein, the configuration of the graphic display control apparatus is shown in a simplified form.

A graphic display control apparatus 1 in accordance with the basic embodiment of the present invention includes a component figure storage unit or means 2 for storing in advance information of height levels of components in one-to-one correspondence to a plurality of component figures; a displayed level range input unit or means 3 for inputting a range of height levels of components that are the object of component figure display; and a displayed figure retrieving unit or means 4 for retrieving and fetching component figures, which are situated within the range of height levels of components input using the displayed level range input means 3, from the component figure storage means 2. Component figures output from the displayed figure retrieving means 4 are selectively displayed.

Preferably, the graphic display control apparatus in accordance with the basic embodiment of the present invention includes a graphic display unit or means 5 for displaying component figures output from the displayed figure retrieving means 4.

According to one aspect, the range of height levels designated using the displayed level range input means 3 indicates only one height level.

According to another aspect, the range of height levels designated using the displayed level range input means 3 indicates an area including one height level and all the height levels lower than this height level.

According to yet another aspect, a range of height levels designated using the displayed level range input means 3 indicates an area including one height level and all the height levels higher than this height level.

In the basic embodiment of the present invention shown in FIG. 1, when component figures are edited, the shape of each of plural specific components or the relationship concerning the location among the specific components is modified. In consideration of the fact that if only some components situated within a given range of height levels could be displayed, the modification of the shape of each of plural specific components, etc., would be achieved satisfactorily, information about a height level is appended to each two-dimensional component figure. Furthermore, only the component figures situated within a range of height levels, which are designated by a designer or the like by using the displayed level input means 3, are displayed on a screen, so that the component figures can be easily manipulated on the screen.

To be more specific, for example, when the graphic display control apparatus shown in FIG. 1 is used to edit component figures, a designer first sets height levels relative to the component figures of components and stores them in advance in the component figure storage means 2 formed with a memory or the like. Height levels relative to component figures can be set according to an arbitrary timing, such as, a time period during production of components or during arrangement thereof.

Next, the designer uses the displayed level range input means 3 such as a pointing device to input an arbitrary range of height levels, which are the object of component figure display to be performed as part of modifying the shape of each component or the positional relationship among them, in the component figure storage means 2. In this case, the range of height levels is fundamentally specified with the upper limit and lower limit.

Furthermore, component figures situated within the range of height levels designated using the displayed level range input means 3 are fetched from the component figure storage means 2 and input to the graphic display means 5 such as a graphic display unit.

The graphic display means 5 selectively displays on a screen the component figures within the range of height levels designated using the displayed level range input means 3.

Herein, the upper limit and lower limit each having the same value, that is, one height level may be designated as the range of height levels. In this case, only the component figures situated at the height level designated by the designer are displayed on the screen.

Furthermore, in designating the range of height levels, the lower limit may be set to a minimum value (for example, zero). In this case, component figures situated in an area including the height level (upper limit) designated by the designer and all the height levels lower than the upper limit are displayed on the screen.

Furthermore, in designating the range of height levels, the upper limit may be set to a maximum value (for example, infinity). In this case, component figures situated in an area including the height level (lower limit) designated by the designer and all the height levels higher than the lower limit are displayed on the screen.

According to the basic embodiment shown in FIG. 1, whichever method of designation is used to designate a display range of component figures, since information about a height level is appended to each component, a designer can selectively display necessary component figures using the thus appended height levels. It will therefore be avoided that components other than those whose shapes or positional relationship should be modified become hindrances.

Figure 2:
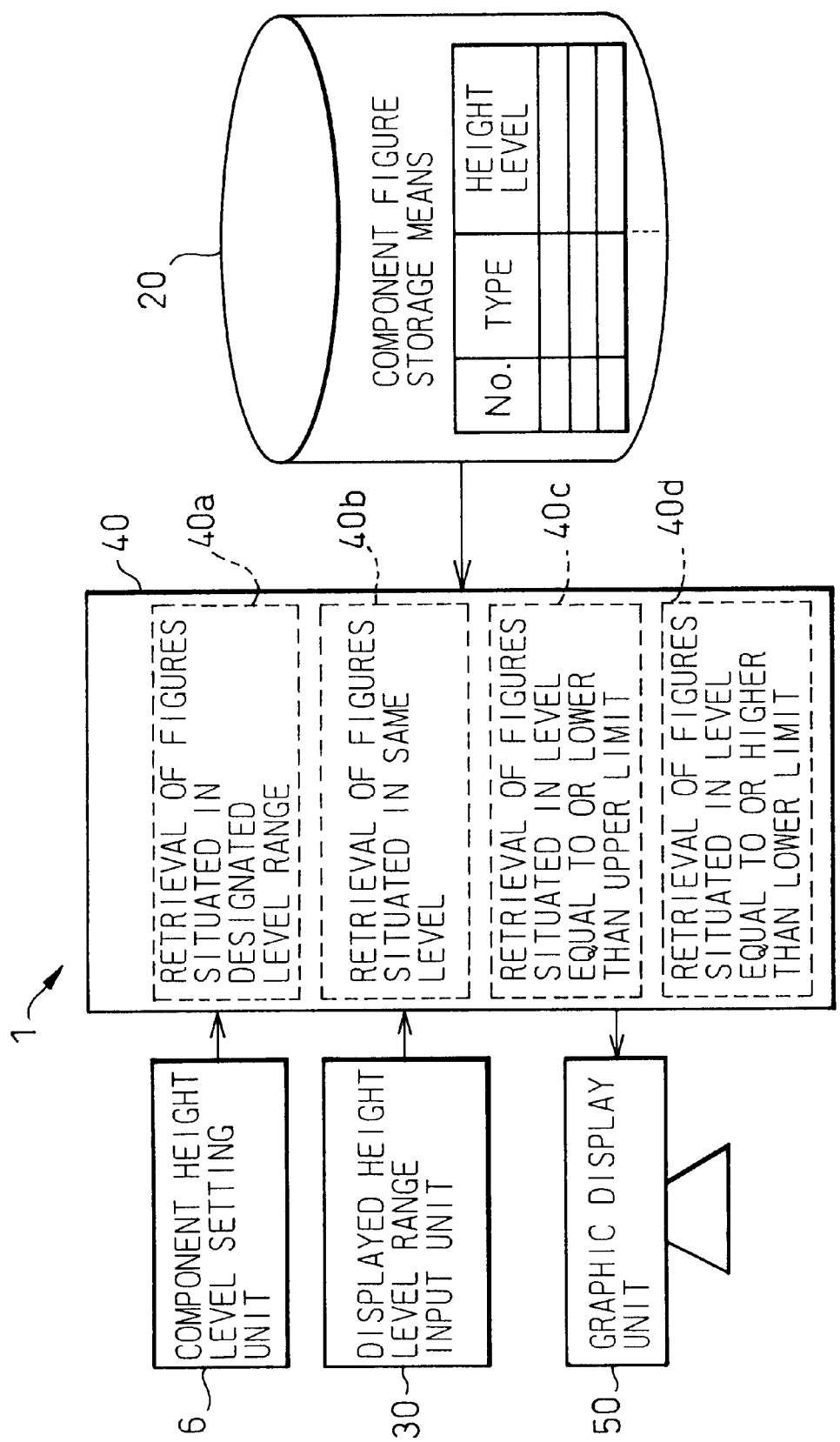
FIG. 2 is a block diagram showing the configuration of a preferred embodiment of the present invention.

FIG. 2 is a block diagram showing the configuration of a preferred embodiment of the present invention. Note that, herein, the configuration of the graphic display control apparatus 1 for displaying the designated component figures on a screen of a CRT or the like and for editing the component figures within a two-dimensional CAD system including a function of automatic hidden-line elimination, is displayed as a typical example. Hereinafter, components identical to those described previously will be assigned the same reference numerals.

In the graphic display control apparatus 1 in accordance with one embodiment shown in FIG. 2, a graphic display control unit 40 realized by a central processing unit (CPU) or microprocessor unit (MPU) is provided as the displayed figure retrieving means 4 (See FIG. 1). The graphic display control unit 40 includes a function 40a of retrieving component figures that are the object of component figure display within a display range and are situated in an area defined by an upper limit and a lower limit of height levels of component figures, a function 40b of retrieving component figures that are the object of component figure display with the same level display and are situated at a location specified by the same height level, a function 40c of retrieving component figures that are the object of component figure display with lower level display and are situated in height levels equal to a designated height level (upper limit) and all the height levels lower than the designated upper limit, and a function 40d of retrieving component figures that are the object of component figure display with upper level display and are situated in height levels equal to a designated level (lower limit) and all the height levels higher than the designated lower limit.

Further, in FIG. 2, a component height level setting unit 6 is provided which sets information about height levels of components in one-to-one correspondence to a plurality of component figures in an assembly drawing prepared by a CAD system. The component height level setting unit 6 is constituted by an input means such as a keyboard employed in conventional computer systems. By manipulating (or maneuvering) the input means, information about height levels concerning a plurality of component figures is stored in the component figure storage means 2 (See FIG. 1) via the graphic display control unit 4.

Furthermore, in FIG. 2, a component figure storage unit or means 20 formed with a read-only memory (ROM), random access memory (RAM), or the like is provided as the component figure storage means 2. In the component figure storage means 20, serial numbers (No.) of components in an assembly drawing, types (transistor, capacitor, resistor, and the like) thereof, and associated height levels are stored in advance in the form of a table. The height levels of components can be set in the stage of fabricating components, the stage of arranging components, or any other stage. Moreover, a ROM or RAM inherently incorporated in a CPU or MPU may be used as the ROM or RAM constituting the component figure storage means 20.

In FIG. 2, a displayed height level range input unit 30 formed with a keyboard, or a pointing device such as a mouse or joystick is provided as the displayed level range retrieving means 3 (See FIG. 1). A designer maneuvers the pointing device of the displayed height level range input unit 30, inputs an upper limit and lower limit of height levels, which are the object of graphic display that is to be performed as a part of a component figure editing process, to the graphic display control unit 40, and thus designates a display range of height levels.

Specific examples of methods for designating the display range of height levels are set forth below.

(1) A first method is such that a keyboard is manipulated (or maneuvered) in order to nearly simultaneously enter values of an upper limit and lower limit of height levels of components that are the object of graphic display as a part of the component figure editing process. In this case, a function of automatic hidden-line elimination is implemented in a two-dimensional CAD system.

(2) A second method is such that a CAD system is deprived of a function of automatic hidden-line elimination and placed in non-hidden-line processing mode, coordinates indicating either one of an upper limit and lower limit of height levels of components that are the object of graphic display as a part of the component figure editing process are designated using a pointing device.

By thus maneuvering the pointing device, component figures that are the object of graphic display with lower level display and are situated in an area including a designated height level and all the height levels lower than the designated height level, or component figures that are the object of graphic display with upper level display and are situated in an area including a designated height level and all the height levels higher than the designated height level, can be retrieved readily. If it is necessary to designate both an upper limit and a lower limit of height levels of components, coordinates indicating either one of the upper limit and lower limit, which are not yet designated, are designated according to the same procedure as described above. Thus, a display range of height levels is designated by both the upper limit and lower limit. After a process for designating height levels is completed, the function of automatic hidden-line elimination is again implemented in the CAD system.

Furthermore, in FIG. 2, a graphic display unit 50 formed with a CRT or the like for displaying component figures, which are the object of graphic display, on a screen is provided as the graphic display means 5 (See FIG. 1). The graphic display unit 50 displays in a screen component figures, which are fetched from the component figure storage means 20 in accordance with a designation of arrange of height levels carried out by using the displayed height level range input unit 30 and that are the object of graphic display as a part of a component figure editing process. A designer utilizes a CAD system including a function of automatic hidden-line elimination, manipulates component figures selectively displayed on a screen of the graphic display unit 50 so as to modify the shape of each component or change the location thereof, and thus can readily produce an assembly drawing composed of numerous component figures.

Referring to the flowcharts of FIGS. 3 to 7, a series of component figure display control processes carried out for editing component figures in accordance with a preferred embodiment of the present invention will be explained in detail.

Figure 3:
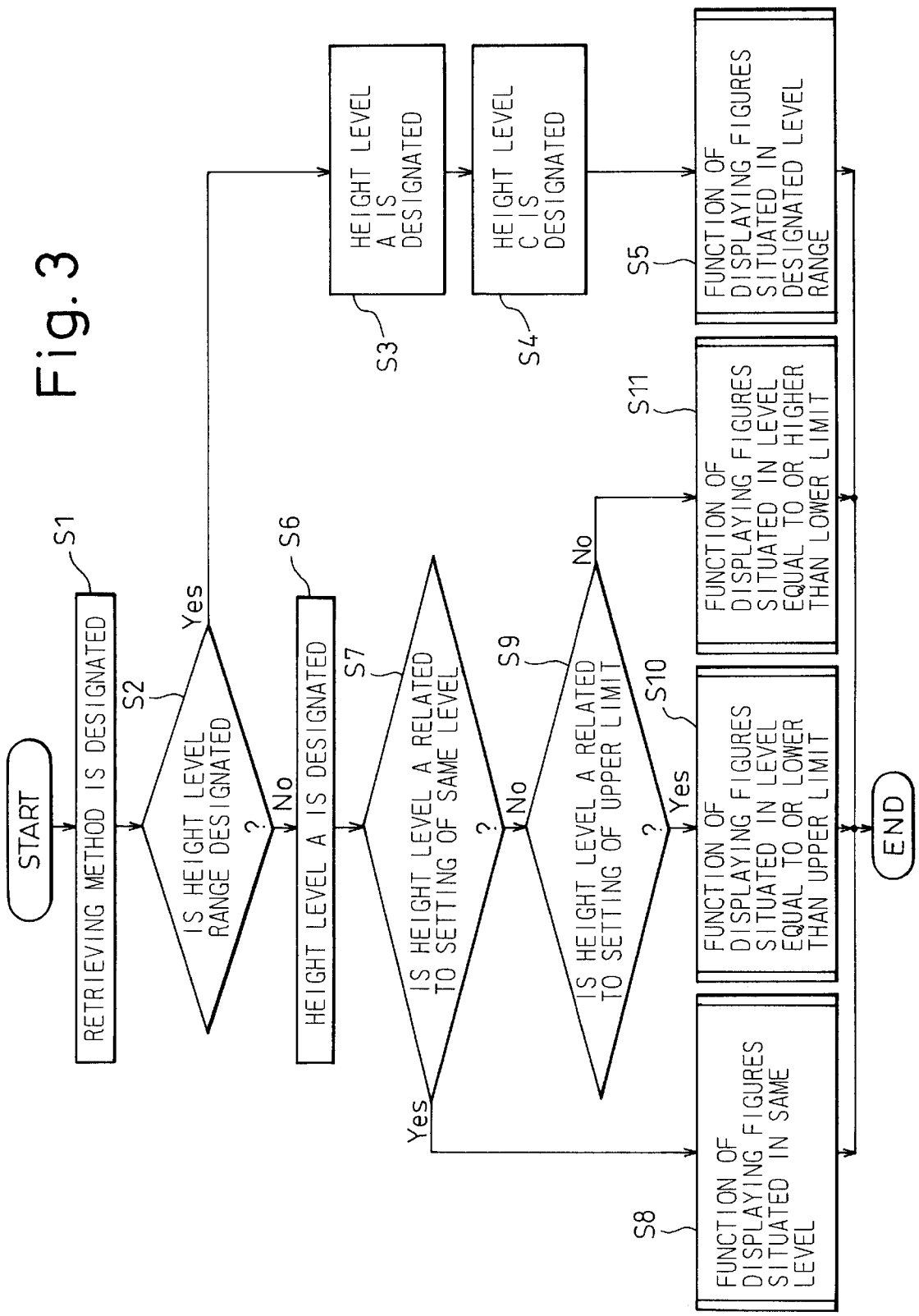
FIG. 3 is a flowchart for describing a component figure display control process in the embodiment shown in FIG. 2.
Figure 4:
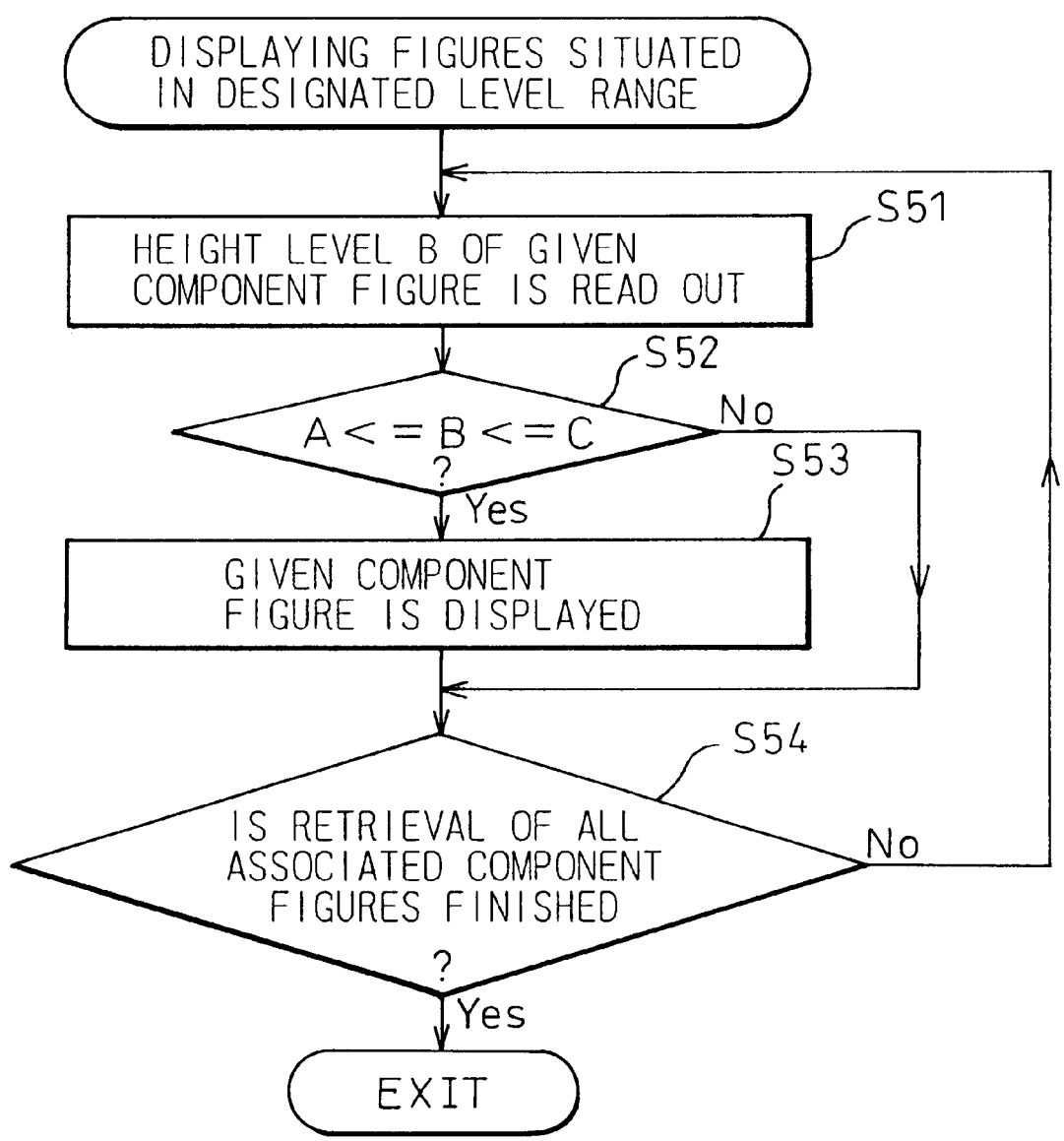
FIG. 4 is a flowchart for describing a procedure for displaying component figures on the basis of a function of displaying component figures situated in a designated level range which is shown in FIG. 3.
Figure 5:
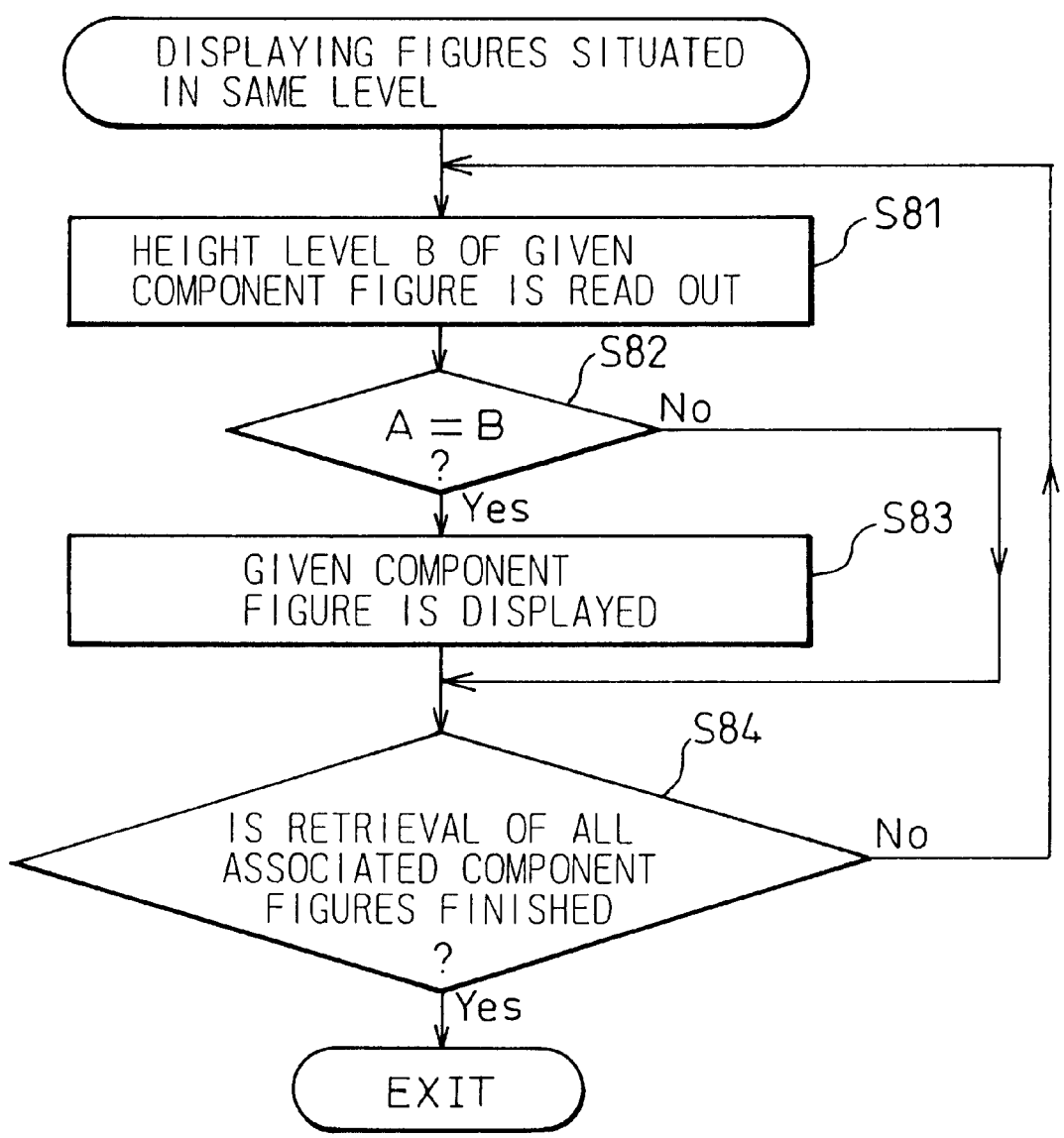
FIG. 5 is a flowchart for describing a procedure for displaying component figures on the basis of a function of displaying component figures situated in the same level which is shown in FIG. 3.
Figure 6:
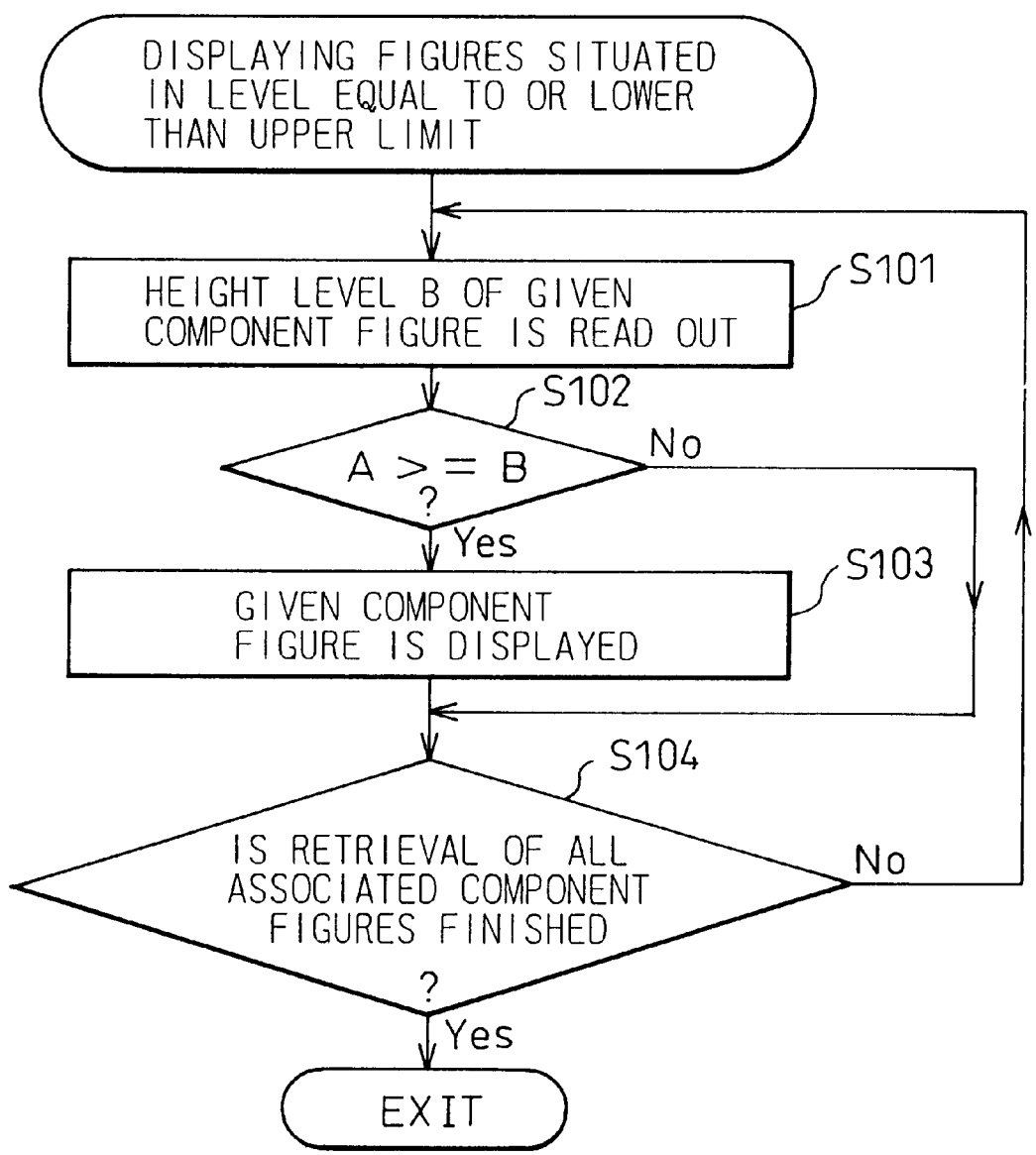
FIG. 6 is a flowchart for describing a procedure for displaying component figures on the basis of a function of displaying figures situated in a level equal to or lower than an upper limit which is shown in FIG. 3.

FIG. 3 is a flowchart for describing a component figure display control process in the embodiment shown in FIG. 2; FIG. 4 is a flowchart for describing a procedure for displaying component figures using a function of displaying component figures situated in a designated level range; FIG. 5 is a flowchart for describing a procedure for displaying component figures using a function of displaying figures situated in the same level; FIG. 6 is a flowchart for describing a procedure for displaying component figures using a function of displaying figures situated in a level equal to or lower than an upper limit; and FIG. 7 is a flowchart for describing a procedure for displaying component figures using a function of displaying figures situated in a level equal to or higher than a lower limit.

For executing the component figure display control process according to the preferred embodiment of the present invention, first, at step S1 in FIG. 3, a method of retrieving height levels of components that are the object of component figure display is selected by a designer. The method of retrieving height levels of components includes ① a method of retrieving component figures that are the object of component figure display within a display range and are situated in an area defined by an upper limit and a lower limit of height levels of component figures; ② a method of retrieving component figures that are the object of component figure display with the same level display and are situated at a location specified by the same height level; ③ a method of retrieving component figures that are the object of component figure display with lower level display and are situated in an area including a designated height level and all the height levels lower than the designated height level; and ④ a method of retrieving component figures that are the object of component figure display with upper level display and are situated in an area including a designated height level and levels higher than the designated height level.

Thereafter, if the designer selects the first method of retrieving component figures that are the object within a display range (as mentioned in the above item ①) (step S2), the designer designates a height level A corresponding to a lower limit of height levels of components that are the object of component figure display, and a height level C corresponding to an upper level thereof, and inputs these height levels A and C to the graphic display control unit 40 (steps S3 and S4). The graphic display control unit 40 executes the function of retrieving component figures that are the object within a display range (step S5).

Referring to FIG. 4, a procedure for displaying component figures on the graphic display unit 50 using the function of retrieving component figures that are the object within the display range display, will be described.

When the function of retrieving component figures that are the object within the display range is executed, as described at step S51 in FIG. 4, the graphic display control unit 40 reads out a height level B of each given component figure from the component figure storage means 20.

The graphic display control unit 40 retrieves component figures having height levels that satisfy a conditional expression $A \leq B \leq C$, that is, component figures of components situated within a display range from height level A to a height level C (step S52 in FIG. 4). The thus retrieved component figures are displayed in a screen of the graphic display unit 50 (step S53). When all components situated within the display range from the height level A to the height level C have been retrieved, the operations from step S51 to step S53 are completed (step S54).

Referring back to FIG. 3, the operations succeeding step S2 will be described. If the designer selects any of the second to fourth methods of retrieving component figures (as mentioned in the above items ② to ④) (step S2), the designer designates a height level A of each component that is the object of component figure display, and inputs the level to the graphic display control unit 40 (step S6). When the graphic display control unit 40 detects that the height level A is related to height level setting for component figures that are the object of the same level display (step S7), the function of retrieving component figures that are the object of the same level display is executed (step S8).

Referring to FIG. 5, a procedure for displaying component figures on the graphic display unit 50 using the function of retrieving component figures that are the object of the same level display, will be described.

When the function of retrieving component figures that are the object of the same level display is executed, as described at step S81 in FIG. 5, the graphic display control unit 40 reads out a height level B of each given component figure from the component figure storage means 20.

The graphic display control unit 40 retrieves component figures having height levels that satisfy the conditional expression A=B, that is, component figures of components situated at the location of a height level A (step S82 in FIG. 5), and displays the thus retrieved component figures on a screen of the graphic display unit 50 (step S83). When all the components situated at the location of the height level A have been retrieved, operations from step S81 to step S83 are completed (step S84).

Referring back to FIG. 3, the operations succeeding step S9 will be described. When the graphic display control unit 40 detects that the height level A is related to a height level setting for component figures that are the object of the lower level display (step S9), the function of retrieving component figures that are the object of the lower level display is executed (step S10).

Referring to FIG. 6, a procedure for displaying component figures on the graphic display unit 50 using the function of retrieving component figures that are the object of the lower level display will be described.

When the function of retrieving component figures that are the object of the lower level display is executed, as described at step S101 in FIG. 6, the graphic display control unit 40 reads out a height level B of each given component figure from the component figure storage means 20.

The graphic display control unit 40 retrieves component figures having height levels that satisfy the conditional expression $A \geq B$, that is, component figures of components situated in an area including a height level A and all the height levels lower than the height level A (step S102 in FIG. 6), and displays the thus retrieved component figures in a screen of the graphic display unit 50 (step S103). When all the components in the area including the height level A and levels lower than the height level A have been retrieved, the operations from step S101 to step S103 are completed (step S104).

Referring back to FIG. 3, the operations of step S9 and step S11 will be described. When the graphic display control unit 40 detects that the height level A is related to a height level setting for component figures that are the object of the higher level display (step S9), the function of retrieving component figures that are the object of the higher level display is executed (step S11).

Referring to FIG. 7, a procedure for displaying component figures on the graphic display unit 50 using the function of retrieving component figures that are the object of the higher level display, will be described.

When the function of retrieving component figures that are the object of the higher level display is executed, as described at step S111 in FIG. 7, the graphic display control unit 40 reads out a height level B of each given component figure from the component figure storage means 20.

The graphic display control unit 40 retrieves component figures having height levels that satisfy a conditional expression $A \leq B$, that is, component figures of components situated in an area including a height level A and all the height levels higher than the height level A (step S112 in FIG. 6), and displays the thus retrieved component figures on a screen of the graphic display unit 50 (step S113). When all the components in the area including the height level A and all the height levels higher than the height level A that have been retrieved, operations from step S111 to step S113 are completed (step S114).

According to the embodiment of the present invention, when an assembly drawing or the like is prepared by combining numerous components by means of a CAD system including a function of automatic hidden-line elimination, a designer can retrieve components that are the object of component figure display by using information about height levels. When it is intended to modify the shape of each of some components or the relationship in location among these components, only the necessary components can be selected and displayed on a screen. Consequently, component figures of components that should be modified can be easily manipulated on a screen, and an assembly drawing or the like made by combining numerous components can be readily prepared.

Referring to FIGS. 8 to 10, states in which component figures that are the object of component figure display are displayed on the graphic display unit 50 according to operations described in FIGS. 5 to 7, will be presented.

FIG. 8 shows a state in which component figures that are the object of the same level display are fetched and displayed on the graphic display unit; FIG. 9 shows a state in which component figures that are the object of the lower level display are fetched and displayed on the graphic display unit; and FIG. 10 shows a state in which component figures that are the object of the higher level display are fetched and displayed on the graphic display unit.

When the function of retrieving component figures that are the object of the same level display is executed (See FIG. 5), an element E1 serving as a reference among component figures of components having a height level A in FIG. 8, is designated. When the graphic display control apparatus of the embodiment of the present invention is not used, and if a CAD system including a function of automatic hidden-line elimination is employed, as shown in a left-hand portion of FIG. 8, all the components P in an assembly drawing are displayed. On the contrary, when the graphic display control apparatus of the embodiment of the present invention is used, as shown in a right-hand portion of FIG. 8, only a component figure Ps, that is, an element E1 serving as a reference among component figures, is extracted and displayed.

When the function of retrieving component figures that are the object of the lower level display is executed (See FIG. 6), an element E1 serving as a reference among component figures in FIG. 9 is designated in the same way as in FIG. 8. When the graphic display control apparatus of the embodiment of the present invention is not used, if a CAD system including a function of automatic hidden-line elimination is employed, as shown in a left-hand portion of FIG. 9, all the components P in an assembly drawing are displayed. On the contrary, when the graphic display control apparatus of the embodiment of the present invention is used, as shown in a right hand portion of FIG. 9, some component figures Pd situated in the same height level (i.e., upper limit) as that of an element E1 serving as a reference among component figures and in all the height levels lower than the upper limit, are extracted and displayed.

When the function of retrieving component figures that are the object of higher level display is executed (See FIG. 7), an element E1 serving as a reference among component figures in FIG. 10 is designated in the same way as in FIG. 9. When the graphic display control apparatus of the embodiment of the present invention is not used, if a CAD system including a function of automatic hidden-line elimination is employed, as shown in a left-hand portion of FIG. 10, all the components P in an assembly drawing are displayed. In contrast, when the graphic display control apparatus of the embodiment of the present invention is used, as shown in a right-hand portion of FIG. 10, some component figures Pu situated in the same height level (i.e., lower limit) as that of an element E1 serving as a reference among component figures and in all the height levels higher than the lower limit, are extracted and displayed.

In any one of FIGS. 8 to 10, a designer can retrieve necessary component figures and display them on a screen of the graphic display unit 50. The designer can therefore display and edit component figures with relatively simple operations without a necessity for intervening in a work flow.

As described above, firstly, according to a graphic display control apparatus in accordance with a preferred embodiment of the present invention, when an assembly drawing or the like is prepared by combining numerous components using a two-dimensional CAD system including a function of automatic hidden-line elimination, since information about a height level is appended to each component, a designer can select and display necessary component figures using the height levels. Component figures can therefore be displayed and edited with simple operations without a necessity for intervening in a work flow. An assembly drawing or the like can be readily prepared. Consequently, the graphic display control apparatus contributes greatly to an improvement of component figure editing through a two-dimensional CAD system.

Secondly, according to the graphic display control apparatus in accordance with the preferred embodiment of the present invention, necessary component figures can be selected and displayed on a screen of a graphic display means such as a CRT. The shape of each component figure and the positional relationship among the component figures can be modified with simple operations by observing the component figures on the screen.

Thirdly, according to the graphic display control apparatus in accordance with the preferred embodiment of the present invention, component figures situated in the same height level can be selected and displayed. This is advantageous in executing a modification of the shape of each of only the component figures at the same height level and the positional relationship among the component figures.

Fourthly, according to the graphic display control apparatus in accordance with the preferred embodiment of the present invention, component figures situated in an area including a reference height level and all the height levels lower than the reference height level can be selected and displayed. This is advantageous in executing a modification of the shape of each of component figures in an area including a reference height level and all the height levels lower than the reference height level and the positional relationship among the component figures.

Fifthly, according to the graphic display control apparatus in accordance with the preferred embodiment of the present invention, component figures situated in an area including a reference height level and all the height levels higher than the reference height level can be selected and displayed. This is advantageous in executing a modification of the shape of each of component figures in an area including a reference height level and all the height levels higher than the reference height level and the positional relationship among the component figures.

We claim:

1. A graphic display control apparatus, which allows display of a plurality of component figures respectively corresponding to a plurality of components with the component figures overlapped with each other and displayed, in a computer aided design concerning the plurality of components, comprising:

a display device;

a pointing device;

component figure storage means for storing, in advance, information of height levels of said components in one-to-one correspondence to said plurality of component figures;

display level range input means for inputting a range of height levels by pointing to one of plural figures being displayed, by using said pointing device; and display figure retrieving means for retrieving and fetching said component figures, which are situated within said range of height levels input using said displayed level range input means, from said component figure storage means, wherein said component figures output from said display figure retrieving means are selectively displayed.

2. A graphic display control apparatus as set forth in claim 1, further comprising graphic display means for displaying said component figures output from said displayed figure retrieving means.

3. A graphic display control apparatus as set forth in claim 2, wherein said range of height levels designated using said display level range input means indicates only one height level.

4. A graphic display control apparatus as set forth in claim 2, wherein said range of height levels designated using said display level range input means indicates an area including one height level and levels lower than said one height level.

5. A graphic display control apparatus as set forth in claim 2, wherein said range of height levels designated using said display level range input means indicates an area including one height level and levels higher than said one height level.

6. A graphic display control apparatus as set forth in claim 1, wherein said range of height levels designated using said display level range input means indicates only one height level.

7. A graphic display control apparatus as set forth in claim 1, wherein said range of height levels designated using said display level range input means indicates an area including one height level and levels lower than said one height level.

8. A graphic display control apparatus as set forth in claim 1, wherein said range of height levels designated using said display level range input means indicates an area including one height level and levels higher than said one height level.

9. A graphic display control method which allows display of component figures which are overlapped with each other, comprising:

storing in advance height level information for the component figures;

inputting a range of component height levels by pointing to one of plural figures being displayed, by using a pointing device; and retrieving the component figures which are situated within the range of component height levels input, wherein the component figures are selectively displayed.

10. A graphic display control apparatus which allows display of component figures which are overlapped with each other, comprising:

a storage unit to store height level information for the component figures;

an input unit to input a range of component height levels by pointing to one of plural figures being displayed, by using a pointing device; and a retrieving unit to retrieve the component figures which are situated within the range of component height levels input, wherein the component figures are selectively displayed.

11. A graphic display control apparatus which allows display of component figures which are overlapped with each other, comprising:

a storage unit to store level information for the component figures;

an input unit to input a range of component levels by pointing to one of plural figures being displayed, by using a pointing device; and a retrieving unit to retrieve the component figures which are situated within the range of component levels input, so that the component figures are selectively displayed.

* * * * *